May 15, 1956 G. K. GUTTWEIN ET AL 2,745,907
TONE CONTROL CIRCUIT
Filed May 3, 1951
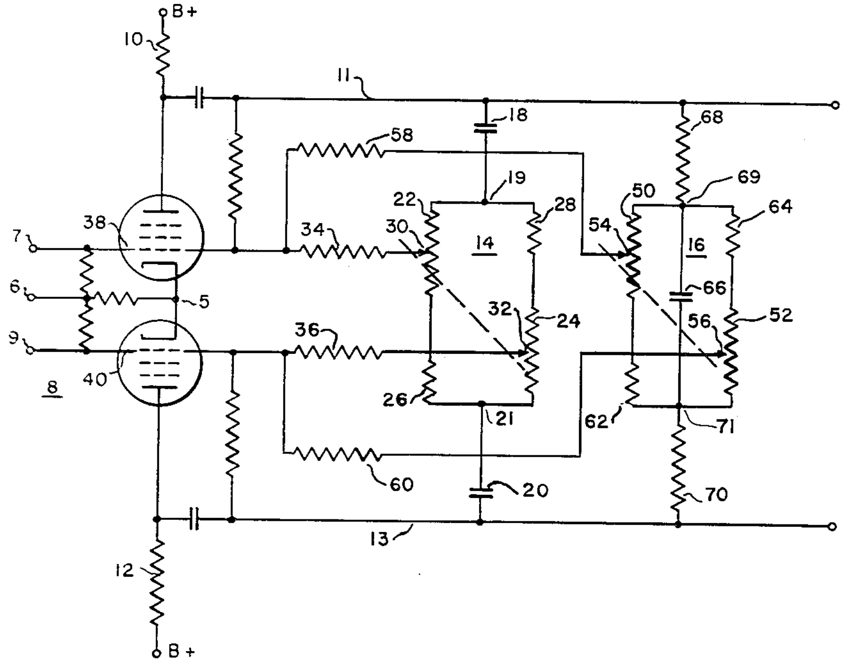
INVENTORS
GUNTER K. GUTTWEIN
CARLTON E. BESSEY
BY Harry M. Saragovitz
Attorney

United States Patent Office 2,745,907

Patented May 15, 1956

2,745,907

TONE CONTROL CIRCUIT

Gunter K. Guttwein, Long Branch, and Carlton E. Bessey, Little Silver, N. J., assignors to the United States of America as represented by the Secretary of the Army Application May 3, 1951, Serial No. 224,436

9 Claims. (Cl. 179—171)

(Granted under Title 35, U. S. Code (1952), sec. 266)

The invention described herein may be manufactured and used by or for the Government for governmental purposes, without the payment of any royalty thereon.

This invention relates to tone controls and more particularly to circuits for changing the relative gain of an audio amplifier over various frequency ranges.

It is important to incorporate, in audio amplifiers and public address systems, a tone control that may be used to provide correction for the acoustic condition of the room, the frequency response of the amplifier, the response characteristics of loud speaker, or the recording characteristics of various types of records. It is usually desirable to design a circuit that has little or no effect on the medium frequency range, but that can be adjusted to provide at least 10 decibel boost or 10 decibel loss at the upper and lower ends of the audible frequency range.

There are several types of control circuits, but these circuits usually include chokes, or introduce a considerable overall loss in the circuit. It is particularly desirable to avoid the use of chokes in tone control circuits since they are expensive, sensitive with respect to hum pick-up and may involve difficulties at resonant frequencies. The majority of the presently used tone controls using only resistive and capacitive elements introduce a considerable initial loss into the circuit and achieve tone control by increasing or decreasing the mean level of loss over the desired band of frequencies. This type of control is so well known that the use of a tone control in a circuit usually implies various losses, and requires additional stages of gain that add to the expense and decrease the amplifier's fidelity.

It is, therefore, an object of this invention to provide a circuit for controlling the relative frequency response of an amplifier.

It is an additional object of this invention to provide a circuit for increasing or decreasing the relative gain of an amplifier over certain frequency ranges.

It is an additional object of this invention to provide a tone control circuit that introduces relatively little decrease in the overall gain of the amplifier.

It is an additional object of this invention to provide a circuit for increasing or decreasing the relative gain of an amplifier over certain frequency ranges without increasing or decreasing the overall gain of the amplifier.

Other and further objects of this invention will become apparent from the following specification and the drawing which shows a preferred embodiment of this invention.

Referring now to the drawing one stage of an audio amplifier is shown, including input circuit 8, cathode biasing circuit and plate loads 10 and 12 in conventional, push-pull arrangement. Across the push-pull outputs 11 and 13 in this circuit the tone control networks 14 and 16 are shown. The network 14 is for controlling the relatively high frequencies end of the audible range and the network 16 is for controlling the relatively low frequency end of the audible range.

Network 14 comprises the condensers 18 and 20 in series with the resistance network 22, 24, 26 and 28. Resistances 22 and 24 are variable voltage dividers or potentiomers with control points 30 and 32 each connecting through one of series resistors 34 and 36, to one of the grids 38 and 40 of the preceding input stage.

Variable potentiometers 50 and 52 may be included in a low frequency responsive network with the control points 54 and 56 also connected back-through resistors 58 and 60 to the grids 38 and 40 of the preceding stage. Resistances 50 and 52 are connected in series with resistances 62 or 64 respectively and in parallel with condenser 66, which is connected across the push-pull outputs 11 and 13 through resistors 68 and 70.

In operation, the high frequency network 14 will be increasingly responsive to the higher frequencies of the audible spectrum to an extent determined largely by the size of the capacitors 18 and 20. An increase or decrease in these capacitors will raise or lower the relative frequency at which this tone control becomes effective. It will be clear that the voltage developed across points 19 and 21 will be relatively greater for frequencies at the higher end of the audible spectrum than they are for the lower frequencies of the audible spectrum which meet a high impedance across condensers 18 and 20. Therefore, any voltages fed back from these points to the grids 38 and 40 will be far more effective for the higher frequencies of the audible spectrum than they are for the lower frequencies.

The voltage dividers 22 and 24 may be set at the electrical centers of the dividing network at which points no feed back voltages will appear at the grids 38 and 40 since the voltages developed across the dividing networks are equal and opposite, regardless of frequency.

When the potentiometers 22 and 24 are varied in one direction the voltage feed back to the grids will be out of phase with the input voltages and a degenerative effect will take place that is increasingly strong toward the upper end of the audible spectrum, since, as pointed out earlier, the voltages developed across this divider network are comparatively greater for the high frequencies. The degree of degeneration may be as great as desired within particular limits. When the voltage dividers are moved in the other direction, a positive feed back results, that will increase the relative gain of the amplifier stage, particularly for the higher frequencies. Resistors 26 and 28 are provided in series with the variable potentiometer in each arm of the network in the direction of positive feed back to act as limiters since, of course, the amount of positive feed back that can be tolerated in any given circuit is limited. An excess of positive feedback is to be avoided to eliminate the possibility of the circuit breaking into oscillation.

The directions of positive and negative feedback are quite clear if one considers that the feedback from a plate to its own grid is degenerative. Thus the point 30, that feeds grid 38, will pick up a negative feedback towards output line 11 and, since the A. C. voltage on line 13 is equal and opposite to the A. C. voltage on line 11, the control point 30 will pick up positive feedback toward line 13. Similarly the feedback of point 32 will be negative toward line 13 and positive toward line 11. The limiting resistors 26 and 28 should be in the direction of positive feedback in each case.

The second network operates substantially the same way as the first network excepting that the voltages developed across points 69 and 71 are intended to be effective for the lower frequencies of the audible range. Therefore, the voltage fed back to the grids 38 and 40 of the preceding stage will predominately effect the lower frequencies to provide the so-called "bass boost."

In this network again the limiting resistors 62 and 64 should be provided to avoid the possibility of excessively positive feed back.

In both networks the variable potentiometers are ganged together in such a way that the direction of the feed back, whether positive or negative, is the same to the appropriate grids.

Additional feedback networks controlling, for example, the middle range of audible frequencies, for certain voice applications, and sharply tuned networks for specific frequencies may also be added.

The relative effectiveness of the bass and treble control may be varied by appropriate changes in the components of their respective networks. For instance, as pointed out earlier, the relative effectiveness of the high frequency network 14 may be changed by changes in the condensers 18 and 20, and the relative effectiveness of the low frequency network, which also controls the so-called "turn over point," may be varied by changes in the resistors 68 and 70 and the capacitor 66.

The circuit constants may be chosen to exactly correspond to the various recording characteristics of commercial records. Additional bass and treble control networks might also be connected in parallel with the original bass in the treble control networks for these purposes, since the relative insertion loss is very low and particular effects may be realized by combined settings of several tone controls.

The circuit shown is a "push-pull' stage, having symmetrical inputs and outputs of inverted voltage relation. That is, the input signal at point 7 with respect to a ground point 6 is equal and of opposite polarity to the signal at point 9 with respect to ground. Similarly the signal voltages developed across 1 and 13 are of equal and opposite polarity with respect to ground, and the compensating voltages fed back from the networks 14 and 16 have equal and opposite components. This is a preferred embodiment, but this tone control will work equally well with certain types of phase inverters having a single sided input. For instance the signal could be fed across terminals 6 and 7 with the cathode 5 driving the second tube to give a more or less balanced push-pull output of lower gain. The tone control signal could also be single sided and fed to only one grid providing, as in this case the overall output would be more or less balanced across 11 and 13.

Other features and applications of this tone control circuit will be obvious to those skilled in the art.

What is claimed is:

1. A tone control circuit for a stage of amplification having an input and a push-pull output comprising; a resistance-capacitance network having an input connected across said push-pull output, said network mainly responsive to a particular range of frequencies, said network having an output connected back to the input of said stage, whereby the gain of said stage is varied with respect to frequency as determined by said network.

2. A tone control circuit for a stage of amplification having an input and a push-pull output comprising; a resistance-capacitance network having an input connected across said push-pull output and the output of said network connected across a voltage divider, a movable terminal of said voltage divider connected through a resistance to the input of said amplifier stage.

3. A tone control circuit for a stage of push-pull amplification having an input and an output comprising; a resistance-capacitance network connected across the output of said push-pull stage, said network terminating in a voltage divider at the electrical center of said network, a variable tap on said voltage divider connected to the input of said push-pull amplifier whereby the feed back may be either positive or negative.

4. A low frequency tone control circuit for a push-pull amplifier stage having an input and a push-pull output comprising; a first resistance having a first terminal connected to one terminal of said push-pull output, a second resistance equal to said first resistance having a first terminal connected to the other terminal of said push-pull output, the second terminals of said first and second resistances terminating across a capacitor, a voltage divider connected across said capacitor, said voltage divider having a movable tap connected through a third resistance to the input of said amplifier.

5. A tone control circuit as in claim 4 having a fixed resistor in series with said voltage divider across said capacitor to limit the amount of positive feedback.

6. A high frequency tone control for an amplifier having an input and a push-pull output comprising; a first condenser having a first terminal connected to one terminal of said push-pull output, a second condenser having a first terminal connected to the other terminal of said push-pull output, a second terminal of each of said first and second condensers connected across a resistive voltage divider, said voltage divider having a variable tap connected through a third resistor to the input of said amplifier, whereby the high frequencies may be accentuated or decreased.

7. A tone control as in claim 6 having a fixed resistor in series with said voltage divider to limit the amount of positive feed back to the input of said amplifier.

8. A frequency control circuit for an amplifier having an input and a push-pull output comprising; a plurality of networks sensitive to various frequency ranges connected across the output of said amplifier, an electrical connection between each of said networks and the input of said amplifier to vary the relative response of said amplifier in a desired manner.

9. In a tone control circuit for an amplifier having an input and a push-pull output; a first, second and third element connected in series across said output, said first and third elements consisting of identical impedances of a first type, said second element consisting of a second type of impedance having a voltage dividing terminal, means for connecting said terminal to said input, and said first and second types of impedance varying dissimilarly with respect to frequency.

References Cited in the file of this patent

UNITED STATES PATENTS

| | | |
|---|---|---|
| 1,910,040 | Nordlohne | May 23, 1933 |
| 2,332,782 | Crosby | Oct. 26, 1943 |
| 2,366,565 | Shea et al. | Jan. 2, 1945 |
| 2,372,419 | Ford | Mar. 27, 1945 |
| 2,495,511 | Dolberg | Jan. 24, 1950 |
| 2,580,376 | Moses | Dec. 25, 1951 |
| 2,616,988 | Rodenhuis | Nov. 4, 1952 |

FOREIGN PATENTS

| | | |
|---|---|---|
| 598,287 | Great Britain | Feb. 16, 1948 |